3,448,147
PROCESS FOR WORKING UP AQUEOUS SOLUTIONS CONTAINING A GLYCOL ETHER AND HEXADIENIC ACIDS
Lothar Hörnig, Frankfurt am Main, and Hermann Neu, Neu-Isenburg, Germany, assignors to Farbwerke Hoechst Aktiengesellschaft vormals Meister Lucius & Brüning, Frankfurt am Main, Germany, a corporation of Germany
No Drawing. Filed Apr. 6, 1966, Ser. No. 540,496
Claims priority, application Germany, Apr. 24, 1965, F 45,897
Int. Cl. C07c 57/02, 43/10
U.S. Cl. 260—526                                6 Claims

ABSTRACT OF THE DISCLOSURE

A process for working up an aqueous solution containing a glycol ether and a hexadienic acid is shown. The glycol ethers are of the formula:

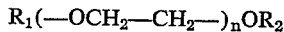

in which $n$ is a whole number within the range of 1 to 3, $R_1$ and $R_2$ each represent an alkyl radical of the formula $C_xH_{2x+1}$ and $x$ is a whole number within the range of 1 to 4. The aqueous solution consisting essentially of glycol ether and hexadienic acid is heated for 0.5 to 5 hours at a temperature within the range of 70° to 150° C. The organic phase thereupon separates from the remaining aqueous phase and may be separated with ease.

---

The present invention relates to a process for working up aqueous solutions containing a glycol ether and hexadienic acids.

It is known that in the manufacture of sorbic acid by thermal splitting of a polyester obtained from crotonaldehyde and ketene in a polyglycol ether serving as a solvent, wash waters are obtained which contain up to 25% by weight of polyglycol ether in addition to hexadienic acids. Hitherto, the polyglycol ether has generally been recovered from these wash waters by distillation. If the polyglycol ether has a higher boiling point than the water, a relatively large amount of water must be evaporated. This is uneconomical in view of the high heat of evaporation of water. If the polyglycol ether is moreover volatile with water vapor or forms an azeotrope with water, the components cannot be technically separated by a simple distillation.

Now we have found that aqueous solutions containing at least one glycol ether and hexadienic acids can be worked up by heating the aqueous solution for 0.5 to 5 hours to a temperature within the range of 70 to 150° C. and isolating the organic phase which separates on heating from the remaining aqueous phase.

The term "glycol ether" is used herein to mean particularly a compound of the formula

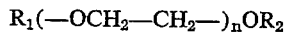

in which $n$ is a whole number within the range of 1 to 3, $R_1$ and $R_2$ each represent an alkyl radical of the formula $C_xH_{2x+1}$ and $x$ is a whole number within the range of 1 to 4. Most of these compounds are miscible with water at 20° C. in any desired ratio. The process of the invention is particularly applicable to polyglycol ethers, i.e. to compounds of the above formula in which $n$ is greater than 1.

Examples of suitable glycol ethers are ethylene glycol dibutyl ether, ethylene glycol ethyl butyl ether, diethylene glycol dimethyl ether, diethylene glycol diethyl ether, diethylene glycol dipropyl ether, triethylene glycol dimethyl ether and triethylene glycol diethyl ether.

By "hexadienic acids" there are meant herein particularly the four position-isomer hexadienic-(2,4) acids. The trans-2, trans-4 form is sorbic acid.

The solutions to be worked up generally contain about 5 to 95% by weight, advantageously 10 to 30% by weight, of glycol ether and 0.5 to 40% by weight, advantageously 1 to 10% by weight, of hexadienic acids.

By heating the solution in accordance with the invention, two phases are formed. The first phase, which has a smaller specific gravity, contains the predominant part of the organic substances (glycol ether and hexadienic acids) in addition to a small amount of water. This phase is designated hereinafter "organic phase." The other phase, which has a higher specific gravity, consists predominantly of water and contains only slight amounts of the above mentioned organic substances, advantageously in concentrations of less than 10% by weight. This phase is called hereinafter "aqueous phase."

The process of the invention may be carried out continuously or discontinuously.

The temperature to which the aqueous solution to be worked up is advantageously heated to obtain an optimum separation, depends on the nature of the glycol ether used. If the required temperature is above 100° C., separation must be carried out under a pressure above the corresponding boiling pressure of the water. This excess pressure is advantageously within the range of 1 to 6 atmospheres gage. If the aqueous solution to be worked up contains mixtures of various glycol ethers, the properties of the glycol ether that requires the highest separation temperature are decisive for the conditions to which the aqueous solution to be worked up has to be subjected.

The total time for which the material to be treated, i.e. the aqueous solution to be worked up and the phases which are formed therefrom by heating, stays in the space in which it is worked up in accordance with the invention, is within the range of from 0.5 to 5 hours, advantageously from 1 to 2 hours.

The higher the two phases in the separating vessel, the more complete the separation of the organic phase from the aqueous phase. The phase boundary surface is therefore kept relatively small by appropriate arrangement of apparatus. Advantageously, a vertically arranged tube is used into the middle section of which the mixture to be treated is advantageously introduced by a metering pump. When the process is carried out without the application of pressure, the organic phase runs over at the head of the tube. The aqueous phase is removed at the lower end of the tube. When the process is carried out with the application of pressure, the organic phase is let off overhead, either discontinuously via a receiver or continuously via a control valve. The aqueous phase is likewise removed via a relief valve. The water vapor is advantageously condensed in a condenser connected in series.

The glycol ether that remains in the aqueous phase after the phases have been separated, may be separated, if desired, by distillation in the form of an azeotrope with water and may then be subjected once more to the process of the invention. The organic phase containing predominantly glycol ether and hexadienic acids may be used again as a solvent for polyesters to be subjected to a thermal splitting. The residual amount of water still contained in the recovered glycol ether is of no importance as compared with the total amount of solvent circulating. The said residual amount of water is automatically eliminated in the splitting of the polyester and the distillation of sorbic acid in each throughput.

The following examples serve to illustrate the invention, the percentages being by weight.

EXAMPLE 1

A vertically arranged jacketed glass tube heated to 90° C. was used. The mixture to be treated was introduced by a metering pump at such a rate that the time of stay of the material to be treated was 2 hours. The organic phase ran off at the head of the tube. The aqueous phase was drawn off at the bottom through a control valve.

Composition of the mixture to be treated:

| | Percent |
|---|---|
| Water | 79.5 |
| Diethylene glycol diethyl ether | 19.9 |
| Hexadienic acids | 0.6 |

Composition of the two phases after separation:

Organic phase—
| | Percent |
|---|---|
| Water | 9.0 |
| Diethylene glycol diethyl ether | 88.6 |
| Hexadienic acids | 2.4 |

Aqueous phase—
| | |
|---|---|
| Water | 93.7 |
| Diethylene glycol diethyl ether | 6.1 |
| Hexadienic acids | 0.2 |

EXAMPLE 2

A vertically arranged jacketed steel pipe which was heated with low-pressure steam was used. The mixture to be worked up was introduced by a metering pump at such a rate that the time of stay of the material to be treated mounted to 4 hours. By introducing nitrogen, the gas space over the organic phase was maintained at a constant pressure of 2.4 atmospheres gage. The temperature in the liquid to be worked up amounted to 130° C. The organic phase ran off at the head of the pipe into a closed cooled receiver. The contents of the receiver were discontinuously removed through a valve. The aqueous phase was continuously drawn off at the bottom of the pipe through a valve. The steam which had been released from pressure was condensed in a series-connected condenser.

Composition of the mixture to be treated:

| | Percent |
|---|---|
| Water | 86.0 |
| Triethylene glycol dimethyl ether | 11.4 |
| Hexadienic acids | 2.6 |

Composition of the two phases after separation:

Organic phase—
| | Percent |
|---|---|
| Water | 11.2 |
| Triethylene glycol dimethyl ether | 76.1 |
| Hexadienic acids | 12.7 |

Aqueous phase—
| | |
|---|---|
| Water | 91.8 |
| Triethylene glycol dimethyl ether | 6.5 |
| Hexadienic acids | 1.7 |

EXAMPLE 3

The apparatus and the reaction conditions were the same as those described in Example 2.

The commercial polyglycol ether contained in the mixture to be treated constituted a mixture of diethylene glycol diethyl ether and triethylene glycol diethyl ether in addition to small amounts of glycol ethers of low and high degrees of oxethylation.

Composition of the mixture to be treated:

| | Percent |
|---|---|
| Water | 77.1 |
| Polyglycol diethyl ether | 21.1 |
| Hexadienic acids | 1.8 |

Composition of the two phases after separation:

Organic phase—
| | Percent |
|---|---|
| Water | 9.3 |
| Polyglycol diethyl ether | 77.3 |
| Hexadienic acids | 13.4 |

Aqueous phase—
| | |
|---|---|
| Water | 93.1 |
| Polyglycol diethyl ether | 5.5 |
| Hexadienic acids | 1.4 |

What is claimed is:

1. A process for working up aqueous solutions consisting essentially of at least one glycol ether of the formula:

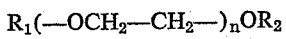

$$R_1(-OCH_2-CH_2-)_nOR_2$$

in which $n$ is a whole number within the range of 1 to 3, $R_1$ and $R_2$ each represent an alkyl radical of the formula $C_xH_{2x+1}$ and $x$ is a whole number within the range of 1 to 4, and a hexadienic acid which comprises: heating the aqueous solution for 0.5 to 5 hours to a temperature within the range of 70° to 150° C. and under a pressure in excess of the vapor pressure of said solution; and separating the organic phase which forms from the remaining aqueous phase.

2. The process of claim 1 wherein the aqueous solution contains 5 to 95% by weight of glycol ether.

3. The process of claim 1 wherein the aqueous solution contains 0.5 to 40% by weight of hexadienic acids.

4. The process of claim 1 wherein the two phases are separated continuously.

5. The process of claim 1 wherein the solution is heated to a temperature above 100° C. under a pressure within the range of 1 to 6 atmospheres gage.

6. The process of claim 1 wherein the aqueous solution is heated for 1 to 2 hours.

References Cited

UNITED STATES PATENTS

| | | | |
|---|---|---|---|
| 3,021,365 | 2/1962 | Fernholz et al. | 260—526 |
| 3,113,149 | 12/1963 | Probst et al. | 260—526 |

LORRAINE A. WEINBERGER, *Primary Examiner.*

M. G. BERGER, *Assistant Examiner.*